United States Patent [19]

Reisacher et al.

[11] Patent Number: 5,814,140
[45] Date of Patent: Sep. 29, 1998

[54] PIGMENT PREPARATIONS SUITABLE FOR WATER-THINNABLE PRINTING INKS AND COATINGS

[75] Inventors: Hansulrich Reisacher, Sachsenheim; Joachim Jesse, Weisenheim, both of Germany

[73] Assignee: BASF Aktiengesellschaft, Ludwigshafen, Germany

[21] Appl. No.: 815,580

[22] Filed: Mar. 12, 1997

[30] Foreign Application Priority Data

Mar. 19, 1996 [DE] Germany ................ 196 10 702.4

[51] Int. Cl.⁶ ..................................... C08K 5/00
[52] U.S. Cl. ................ 106/31.89; 106/316; 106/31.72; 106/31.73; 106/402; 106/413; 106/493; 106/500
[58] Field of Search ................ 106/31.6, 31.72, 106/31.73, 31.89, 402, 413, 493, 500

[56] References Cited

U.S. PATENT DOCUMENTS

| | | | |
|---|---|---|---|
| 3,635,745 | 1/1972 | Rentel et al. .................. | 106/493 |
| 4,334,932 | 6/1982 | Roueche ....................... | 524/191 |
| 4,464,203 | 8/1984 | Belde et al. ................... | 106/413 |
| 5,082,498 | 1/1992 | Kurtz et al. ................... | 106/499 |
| 5,281,261 | 1/1994 | Lin .............................. | 106/31.65 |

FOREIGN PATENT DOCUMENTS

| | | |
|---|---|---|
| 0 039 307 | 11/1981 | European Pat. Off. . |
| 0 084 645 | 8/1983 | European Pat. Off. . |
| 0 592 907 | 4/1994 | European Pat. Off. . |
| 25 02 839 | 12/1978 | Germany . |
| 39 20 251 | 1/1991 | Germany . |

*Primary Examiner*—Mark L. Bell
*Assistant Examiner*—Scott L. Hertzog
*Attorney, Agent, or Firm*—Oblon, Spivak, McClelland, Maier & Neustadt, P.C.

[57] ABSTRACT

Pigment preparations obtainable by coating an organic pigment suspended in an aqueous medium with a resin having an acid number of ≧200 and with a nonionic surfactant, and isolating and optionally drying and mechanically comminuting the coated pigment, are useful for pigmenting water-thinnable printing inks and coatings.

9 Claims, No Drawings

PIGMENT PREPARATIONS SUITABLE FOR WATER-THINNABLE PRINTING INKS AND COATINGS

PIGMENT PREPARATIONS SUITABLE FOR WATER-THINNABLE PRINTING INKS AND COATINGS

The present invention relates to novel pigment preparations obtainable by coating an organic pigment suspended in an aqueous medium with a resin having an acid number of $\geq 200$ and with a nonionic surfactant, and isolating and optionally drying and mechanically comminuting the coated pigment.

The invention also relates to the making of these pigment preparations and their use for pigmenting water-thinnable printing inks and coatings and also to water-thinnable printing inks and coatings comprising these pigment preparations.

It is well known that direct incorporation of as-synthesized organic pigments into binder systems for printing inks or coatings leads to poor rheological properties and unsatisfactory coloristics on the part of the pigmented systems. The pigments are therefore subjected to an additional treatment in an attempt to improve their application properties.

EP-A-84 645 U.S. Pat. No. 4,464,203 describes the coating of pigments with polymeric reaction products of ethylenediamine, propylene oxide (PO) and ethylene oxide (EO) that consist predominantly of PO by conjoint dry or wet grinding and subsequent spray or freeze drying and also the coating of C.I. Pigment Red 48:1 with an ethylenediamine/PO/EO adduct and a styrene/acrylic acid resin by conjoint kneading. DE-A-39 20 251 U.S. Pat. No. 5,082,458 discloses the making of pigment preparations likewise suitable for waterborne printing inks by coating the pigments in aqueous suspension with ethylenediamine/PO/EO adducts having a predominant EO content.

In EP-A-592 907 azo pigments usable in aqueous binder systems are obtained by precipitating the calcium salts of acrylate resins. EP-A-39 307 U.S. Pat. No. 4,082,458 describes the coating of azo pigments with acrylate resins having a low acid number.

However, existing pigment preparations are unsatisfactory in various respects, whether because of their application properties, which frequently lead to unsatisfactory transparency on the part of the printing ink systems pigmented therewith, or whether because of their costly manner of manufacture.

It is an object of the present invention to provide organic pigment preparations which are suitable for waterborne binder systems and have advantageous application properties.

We have found that this object is achieved by pigment preparations obtainable by coating an organic pigment suspended in an aqueous medium with a resin having an acid number of $\geq 200$ and with a nonionic surfactant, and isolating and optionally drying and mechanically comminuting the coated pigment.

The present invention also provides the so defined process for making the pigment preparations.

The present invention further provides for the use of the pigment preparations for pigmenting water-thinnable printing inks and coatings.

The novel pigment preparations are advantageously obtainable by the manufacturing process of this invention wherein the organic pigment (a), in the form of a very finely divided suspension in an aqueous medium, is coated with a resin (b) having an acid number of $\geq 200$ and with a nonionic surfactant (c), or the reaction products of these substances, and the pigment thus coated is isolated and dried and optionally additionally subjected to dry mechanical comminution.

Pigment (a) can be any organic pigment in finely divided form. Suitable pigment classes include for example monoazo, disazo, anthraquinone, anthrapyrimidine, quinacridone, quinophthalone, diketopyrrolopyrrole, dioxazine, flavanthrone, indanthrone, isoindoline, isoindolinone, isoviolanthrone, perinone, perylene, phthalocyanine, pyranthrone, triphenylmethane and thioindigo pigments and also metal complexes thereof.

Particular interest extends to phthalocyanine pigments and especially azo pigments, in which context β-naphthol and naphthol AS pigments and their laked forms and laked BONS pigments should be recited as monoazo pigments and bisacetoacetarylide, disazopyrazolone and especially diaryl yellow pigments as disazo pigments.

The following pigments in the individual classes may be mentioned by way of example:

| | |
|---|---|
| Monoazo pigments: | C.I. Pigment Brown 25; |
| | C.I. Pigment Orange 5, 13, 36 and 67; |
| | C.I. Pigment Red 1, 2, 3, 48:1, 48:4, 49, 49:1, 52:1, 52:2, 53, 53:1, 57:1, 112, 146, 170, 184 and 251; |
| | C.I. Pigment Yellow 1, 3, 73, 74, 65, 97, 151 and 183; |
| Disazo pigments: | C.I. Pigment Orange 16 and 34; |
| | C.I. Pigment Red 144 and 166; |
| | C.I. Pigment Yellow 12, 13, 14, 16, 17, 83, 106, 113, 126, 127, 174, 176 and 188; |
| Anthraquinone pigments: | C.I. Pigment Yellow 147 and 177; |
| | C.I. Pigment Violet 31; |
| Anthrapyrimidine pigments: | C.I. Pigment Yellow 108; |
| Quinacridone pigments: | C.I. Pigment Red 122, 202 and 20; |
| | C.I. Pigment Violet 19; |
| Quinophthalone pigments: | C.I. Pigment Yellow 138; |
| Dioxazine pigments: | C.I. Pigment Violet 23 and 37; |
| Flavanthrone pigments: | C.I. Pigment Yellow 24; |
| Indanthrone pigments: | C.I. Pigment Blue 60 and 64; |
| Isoindoline pigments: | C.I. Pigment Orange 69; |
| | C.I. Pigment Red 260; |
| | C.I. Pigment Yellow 139 and 185; |
| Isoindolinone pigments: | C.I. Pigment Orange 61; |
| | C.I. Pigment Red 257 and 260; |
| | C.I. Pigment Yellow 109, 110, 173 and 185; |
| Metal complex pigments: | C.I. Pigment Yellow 117 and 153; |
| | C.I. Pigment Green 8; |
| Perinone pigments: | C.I. Pigment Orange 43; |
| | C.I. Pigment Red 194; |
| Perylene pigments: | C.I. Pigment Black 31 and 32; |
| | C.I. Pigment Red 123, 149, 178, 179, 190 and 224; |
| | C.I. Pigment Violet 29; |
| Phthalocyanine pigments: | C.I. Pigment Blue 15, 15:1, 15:2, 15:3, 15:4, 15:6 and 16; |
| | C.I. Pigment Green 7 and 36; |
| Pyranthrone pigments: | C.I. Pigment Orange 51; |
| | C.I. Pigment Red 216; |
| Thioindigo pigments: | C.I. Pigment Red 88; |
| Triphenylmethane pigments: | C.I. Pigment Blue 61 and 62; |
| | C.I. Pigment Green 1; |
| | C.I. Pigment Red 81 and 169; |
| | C.I. Pigment Violet 2, 3 and 27; |
| C.I. Pigment Black 1 (aniline black); | |
| C.I. Pigment Yellow 101 (aldazine yellow). | |

Resin (b) can be not only a synthetic resin such as an acrylate resin but also a natural-based resin, especially a carboxyl-containing rosin derivative, such as maleic or fumaric acid-modified rosin having an acid number of $\geq 200$, preferably of from 240 to 320, particularly preferably of from 280 to 320.

Resins of this kind are well known and commercially available.

Suitable nonionic surfactants include for example the alkoxylates, especially the propoxylates and preferably the ethoxylates, also mixed propoxylates/ethoxylates, of saturated or unsaturated aliphatic and aromatic alcohols and aliphatic amines.

Suitable aliphatic alcohols generally contain from 6 to 26 carbon atoms, preferably from 8 to 18 carbon atoms. Suitable examples include octanol, nonanol, decanol, isodecanol, undecanol, dodecanol, 2-butyloctanol, tridecanol, isotridecanol, tetradecanol, pentadecanol, hexadecanol, 2-hexyldecanol, heptadecanol, octadecanol, 2-heptylundecanol, dodecanol, 2-octyldodecanol, 2-nonyltridecanol, 2-decyltetradecanol, oleyl alcohol and 9-octadecanol and also mixtures of these alcohols such as $C_{13}/C_{15}$ and $C_{16}/C_{18}$ alcohols. Particular interest extends to the fatty alcohols obtained from natural raw materials by fat cleavage and reduction and the synthetic fatty alcohols from the oxo process. The alkoxylates of these alcohols customarily have average molecular weights from 400 to 2000.

Suitable aromatic alcohols include besides α- and β-naphthol and their $C_1$–$C_4$-alkyl derivatives especially phenol and its $C_1$–$C_{12}$-alkyl derivatives such as hexylphenol, heptylphenol, octylphenol, nonylphenol, isononylphenol, undecylphenol, dodecylphenol, di- and tributylphenol and dinonylphenol.

Suitable aliphatic amines correspond to the aliphatic alcohols recited above.

Alongside the alkoxylates of these monofunctional amines it is the alkoxylates, especially the mixed PO/EO adducts, of polyfunctional amines, especially of di- to pentafunctional amines, as known from DE-A-25 02 839 (G.B. 1,537,374), which are of particular interest for use as nonionic surfactant (c).

Examples of suitable polyfunctional amines of the formula $H_2N$—$(R—NR^1)_n$—$H$ (R: $C_2$–$C_6$-alkylene; $R^1$: hydrogen or $C_1$–$C_6$-alkyl; n:1–5) include diethylenetriamine, triethylenetetramine, tetraethylenepentamine, 1,3-propylenediamine, dipropylenetriamine, 3-amino-1-ethyleneaminopropane, dihexamethylenetriamine, 1,6-bis(3-aminopropylamino)hexane, N-methyldipropylenetriamine and especially ethylenediamine. These alkoxylates are prepared by reacting the amine initially with propylene oxide and then with ethylene oxide and generally have average molecular weights from 1000 to 45,000, preferably 3000 to 40,000.

A further group of suitable nonionic surfactants (c) are PO/EO block polymers, especially those having polypropylene glycol as central moiety. The average molecular weight of the propylene glycol block is customarily from 850 to 3250, and the proportion of polyethylene glycol in the polymer molecule is generally within the range from 10 to 50%.

The nonionic surfactants mentioned are well known and commercially available. It will be appreciated that, like the other components of the novel pigment preparations, mixtures of these surfactants can be used as well.

The pigment preparations of the present invention generally comprise from 50 to 94% by weight of organic pigment (a), from 3 to 30% by weight of resin (b) and from 3 to 20% by weight of surfactant (c).

The resin coating improves the color strength of the organic pigment. The amount of coating preferably used varies with the type of pigment. For instance, azo pigments are preferably coated with from 5 to 50, particularly preferably with from 10 to 40, % by weight of resin (b) and preferably with from 3 to 25%, particularly preferably with from 5 to 20, % by weight of surfactant (c), in each case based on the azo pigment. In the case of phthalocyanine pigments, preferred amounts of resin (b) range from 2 to 10% by weight, especially from 2.5 to 7.5% by weight, and preferred amounts of surfactant (c) range from 4 to 20% by weight, especially from 5 to 15% by weight, likewise each based on the phthalocyanine pigment.

It will be appreciated that the pigment preparations of this invention may additionally include further customary pigment preparation assistants such as plasticizers, waxes, stabilizers and fillers and also resins of a lower acid number.

The organic pigment is coated according to the present invention in the form of pigment particles suspended in a very fine state of division in an aqueous medium. Such suspensions can be obtained by stirring up the as-synthesized, water-moist press cake in water. This type of coating is advisable for example in the case of β-copper phthalocyanine pigments which are isolated as aqueous press cakes following the salt kneading of crude copper phthalocyanine. Advantageously the coating can also be coupled with the synthesis of the pigment by adding resin (b) and surfactant (c) to the reaction mixture individually or together before, during or after the synthesis of the pigment. An example for this is the coating of azo pigments, which can be combined in the aforementioned manner with the coupling reaction between the di- or tetrazotized azo component and the coupling component.

A preferred embodiment of the manufacturing process of this invention comprises, especially in the case of azo pigments, adding resin (b) and surfactant (c) to the as-synthesized pigment suspension. The resin is advantageously added as a dissolved resin soap; but it can also be dissolved in the pigment suspension by addition especially of an aqueous inorganic base such as sodium hydroxide solution. In the coating of azo pigments it is in any event advisable to adjust the pigment suspension initially to a pH typically within the range from 8 to 12. Subsequent addition of an organic acid such as acetic acid or preferably of an inorganic acid such as hydrochloric acid or sulfuric acid lowers the suspension pH to about 4–6 and precipitates the resin onto the pigment particles.

It is particularly advantageous to effect the resin precipitation in the presence of surfactant (c), i.e. to add the surfactant to the pigment suspension before the acid is added and preferably also before the resin is added.

The pigment is further preferably coated hot. Suitable temperatures for this generally range from 60° to 100° C., especially from 80° to about 98° C. (corresponding to the boiling point). A convenient procedure comprises heating the pigment suspension to the desired temperature before the resin is precipitated (in which case the addition of surfactant and/or resin can take place before or after the heating), stirring the suspension at that temperature for from about 10 to 30 min, then adding the acid, and further stirring at the selected temperature for from about 10 to 30 min.

After cooling, generally to 40°–60° C., the subsequent isolation of the coated pigment can be effected in a conventional manner by filtration, washing with hot water and drying at from 50° to 80° C. However, the as-filtered, highly concentrated press cake having a pigment content of customarily from 40 to 50% by weight can also be incorporated directly into the particular application medium.

It is frequently advantageous to subject the isolated and dried pigment to dry mechanical comminution, for example ball milling or pinned-disk milling.

The pigment preparations of this invention are advantageously useful for pigmenting water-thinnable printing inks and coatings because of excellent application properties such as good dispersibility and good coloristics, especially good luster and very good transparency. A further advantage is their simplicity and economy of manufacture.

EXAMPLES

I) Production of Pigment Preparations According to this Invention

Examples 1 to 18

First the following azo pigments were prepared in a well known manner:

C.I. Pigment Yellow 13:

The tetrazo component was prepared by admixing a solution of 73.8 g of 3,3'-dichloro-4,4'-diaminobiphenyl (3,3'-dichlorobenzidine) in 1750 ml of 1N hydrochloric acid at 0° C. with 41.1 g of sodium nitrite. Excess nitrous acid was then removed with sulfamic acid, and then the solution was filtered.

The coupling component was prepared by dissolving 126 g of acetoacet-2,4-dimethylanilide in 807 ml of 1.5N sodium hydroxide solution.

The coupling vessel was charged with 820 ml of 0.5N acetic acid. Sufficient coupling component was then added to pH 4.5. The tetrazo component and the rest of the coupling component were then added simultaneously while holding the pH at 4.5 and the temperature at 20° C.

C.I. Pigment Yellow 12:

The pigment suspension was prepared similarly to C.I. Pigment Yellow 13 by coupling 80.4 g of tetrazotized 3,3'-dichlorobenzidine (44.7 g of sodium nitrite) with 118 g of acetoacetanilide.

C.I. Pigment Yellow 14:

The pigment suspension was prepared similarly to C.I. Pigment Yellow 13 by coupling 77 g of tetrazotized 3,3'-dichlorobenzidine (42 g of sodium nitrite) with 112 g of acetoacet-2-methylanilide.

C.I. Pigment Yellow 83:

The pigment suspension was prepared similarly to C.I. Pigment Yellow 13 by coupling 61.9 g of tetrazotized 3,3'-dichlorobenzidine with 139.4 g of acetoacet-2,5-dimethoxy-4-chloroanilide.

C.I. Pigment Yellow 74:

The tetrazo component was prepared by admixing a solution of 87.0 g of 2-methoxy-4-nitroaniline in 1560 ml of 1N hydrochloric acid with 34.9 g of sodium nitrite at 0° C. Excess nitrous acid was then removed with sulfamic acid and then the solution was filtered. the coupling component was prepared by dissolving 118.2 g of acetoacet-2-methoxyanilide in 720 ml of 1.5N sodium hydroxide solution.

The coupling vessel was charged with 714 ml of 0.5N acetic acid.

The coupling reaction was then carried out similarly to C.I. Pigment Yellow 13.

The pigment coating was carried out using the as-synthesized aqueous suspensions, which each comprised about 200 g of azo pigment.

Variant A:

To the pigment suspension were added x g of surfactant (c) in the form of a 10% strength by weight aqueous solution. The suspension was then heated to 95° C. and stirred at this temperature for 5 min. After a pH of 9.5 had been set with 20% strength by weight sodium hydroxide solution, y g of resin (b), dissolved in z g of 25% strength by weight sodium hydroxide solution, were added. After a further 30 minutes of stirring at 95° C., a pH of 4 was set by adding 10% strength by weight hydrochloric acid. This was followed by a further 15 min of stirring at 95° C.

After cooling to 60° C. by addition of cold water, the coated pigment was filtered off, washed with water at 40° C., dried at 60° C. and milled in a pinned-disk mill.

Variant B:

The pigment suspension was adjusted to pH 9.5 with 20% strength by weight sodium hydroxide solution. Then y g of resin (b), dissolved in z g of 25% strength by weight sodium hydroxide solution, were added. After the suspension had been heated to 95° C. and stirred at 95° C. for 30 minutes, it was adjusted to pH 4 with 10% strength by weight hydrochloric acid. Then x g of surfactant (c) were added in the form of a 10% strength by weight aqueous solution.

After a further 15 minutes of stirring at 95° C., the coated pigment was worked up as in variant A.

Examples 19 to 21

First β-copper phthalocyanine (C.I. Pigment Blue 15:3) was prepared by kneading crude copper phthalocyanine with sodium chloride in the presence of polyethylene glycol (cf. Ullmann's Enzyklopadie der technischen Chemie, 4th edition, volume 18, page 512 (1979)).

The pigment coating was carried out using aqueous suspensions obtained by suspending in each case in 450 ml of water 63 g of β-copper phthalocyanine in the form of the 12.5% strength by weight aqueous press cake isolated from the salt kneading.

Variant C:

To the pigment suspension were added x g of surfactant (c) in the form of a 10% strength by weight aqueous solution. After the suspension had been heated to 90° C. and stirred at 90° C. for 15 minutes, y g of resin (b) (as a 10% strength by weight solution with z g of sodium hydroxide in water) were added.

After a further 40 minutes of stirring at 90° C. and subsequent cooling to 60° C. by addition of cold water, the coated pigment was filtered off, washed neutral with hot water at 60° C., dried at 75° C. and milled in a laboratory mill.

Variant D:

To the pigment suspension were added y g of resin (b) (as a 10% strength by weight solution with z g of sodium hydroxide in water). After the suspension had been heated to 90° C. and stirred at 90° C. for 40 minutes, it was brought to pH 4 by addition of dilute hydrochloric acid. Then x g of surfactant (c) were added in the form of a 10% strength by weight aqueous solution.

Following a further 15 minutes of stirring at 90° C., the coated pigment was worked up as in variant C.

Further details concerning these experiments and their results are shown in Table 1.

TABLE 1

| Example | Pigment | x g | Surfactant (c) | y g | Resin | z g of NaOH | Variant | Yield of dry coated pigment |
|---|---|---|---|---|---|---|---|---|
| 1 | P.Y. 13 | 29 | Reaction product of ethylenediamine with PO and then with EO (EO content: 40%; $\overline{M}$ 12,000) | 57 | Fumaric acid-modified rosin (acid number 300) | 55 | A | 280 g |
| 2 | P.Y. 13 | 29 | Reaction product of ethylenediamine with PO and then with EO (EO content: 40%; $\overline{M}$ 12,000) | 43 | Fumaric acid-modified rosin (acid number 300) | 42 | A | 264 g |
| 3 | P.Y. 13 | 15 | Reaction product of ethylenediamine with PO and then with EO (EO content: 40%; $\overline{M}$ 12,000) | 43 | Fumaric acid-modified rosin (acid number 300) | 42 | A | 250 g |
| 4 | P.Y. 13 | 29 | Reaction product of ethylenediamine with PO and then with EO (EO content: 40%; $\overline{M}$ 12,000) | 57 | Fumaric acid-modified rosin (acid number 300) | 55 | B | 285 g |
| 5 | P.Y. 13 | 33 | Reaction product of ethylenediamine with PO and then with EO (EO content: 40%; $\overline{M}$ 12,000) | 100 | Fumaric acid-modified rosin (acid number 300) | 97 | B | 328 g |
| 6 | P.Y. 13 | 29 | Reaction product of ethylenediamine with PO and then with EO (EO content: 40%; $\overline{M}$ 12,000) | 43 14 | Fumaric acid-modified rosin (acid number 300) + rosin (acid number 160) | 50 | B | 282 g |
| 7 | P.Y. 13 | 29 | Reaction product of ethylenediamine with PO and then with EO (EO content: 40%; $\overline{M}$ 12,000) | 57 | Acrylate resin (acid number 240) | 40 | B | 280 g |
| 8 | P.Y. 13 | 29 | $C_{10}$ oxo alcohol ethoxylate with 8 EO | 57 | Fumaric acid-modified rosin (acid number 300) | 55 | B | 279 g |
| 9 | P.Y. 13 | 29 | Nonylphenol ethoxylate with 10 EO | 57 | Fumaric acid-modified rosin (acid number 300) | 55 | B | 283 g |
| 10 | P.Y. 13 | 29 | Fatty alcohol alkoxylate ($\overline{M}$ 800) | 57 | Fumaric acid-modified rosin (acid number 300) | 55 | B | 280 g |
| 11 | P.Y. 13 | 29 | PO/EO block polymer with central polypropylene glycol block (40% of EO; $\overline{M}$ 2900) | 57 | Fumaric acid-modified rosin (acid number 300) | 55 | B | 285 g |
| 12 | P.Y. 13 | 29 | Reaction product of ethylenediamine with PO and then with EO (EO content: 40%; $\overline{M}$ 12,000) | 57 | Fumaric acid-modified rosin (acid number 300) | 55 | A* | 285 g |
| 13 | P.Y. 13 | 29 | Reaction product of ethylenediamine with PO and then with EO (EO content: 40%; $\overline{M}$ 12,000) | 57 | Fumaric acid-modified rosin (acid number 300) | 55 | B** | 284 g |
| 14 | P.Y. 13 | 29 | Reaction product of ethylenediamine with PO and then with EO (EO content: 40%; $\overline{M}$ 12,000) | 28.5 | Fumaric acid-modified rosin (acid number 300) | 55 | B*** | 252 g |
| C1 | P.Y. 13 | — | — | 57 | Fumaric acid-modified rosin (acid number 300) | 55 | B | 253 g |
| C2 | P.Y. 13 | 29 | Reaction product of ethylenediamine with PO and then with EO (EO content: 40%; $\overline{M}$ 12,000) | — | — | — | B**** | 226 g |
| C3 | P.Y. 13 | 29 | Reaction product of ethylenediamine with PO and then with EO | 57 | Rosin (acid number 160) | 33 | B | 277 g |

TABLE 1-continued

| Example | Pigment | x g | Surfactant (c) | y g | Resin | z g of NaOH | Variant | Yield of dry coated pigment |
|---|---|---|---|---|---|---|---|---|
| 15 | P.Y. 12 | 29 | Reaction product of ethylenediamine with PO and then with EO (EO content: 40%; $\overline{M}$ 12,000) | 57 | Fumaric acid-modified rosin (acid number 300) | 55 | B | 285 g |
| 16 | P.Y. 14 | 29 | Reaction product of ethylenediamine with PO and then with EO (EO content: 40%; $\overline{M}$ 12,000) | 57 | Fumaric acid-modified rosin (acid number 300) | 55 | B | 274 g |
| 17 | P.Y. 83 | 29 | Reaction product of ethylenediamine with PO and then with EO (EO content: 40%; $\overline{M}$ 12,000) | 57 | Fumaric acid-modified rosin (acid number 300) | 55 | B | 285 g |
| 18 | P.Y 74 | 29 | Reaction product of ethylenediamine with PO and then with EO (EO content: 40%; $\overline{M}$ 12,000) | 57 | Fumaric acid-modified rosin (acid number 300) | 55 | B | 276 g |
| 19 | P.B. 15:3 | 6.3 | Reaction product of ethylenediamine with PO and then with EO (EO content: 40%; $\overline{M}$ 12,000) | 6.3 | Fumaric acid-modified rosin (acid number 300) | 1.6 | C | 75 g |
| 20 | P.B. 15:3 | 6.3 | Reaction product of ethylenediamine with PO and then with EO (EO content: 40%; $\overline{M}$ 12,000) | 6.3 | Fumaric acid-modified rosin (acid number 300) | 1.6 | D | 75 g |
| 21 | P.B. 15:3 | 6.3 | Reaction product of ethylenediamine with PO and then with EO (EO content: 40%; $\overline{M}$ 12,000) | 3.2 | Fumaric acid-modified rosin (acid number 300) | 0.8 | D | 71.5 g |
| C4 | P.B. 15:3 | 6.3 | Reaction product of ethylenediamine with PO and then with EO (EO content: 40%; $\overline{M}$ 12,000) | — | — | — | D | 67.7 g |
| C5 | P.B. 15:3 | — | — | 6.3 | Fumaric acid-modified rosin (acid number 300) | 1.6 | D | 69 g |

*surfactant (c) was added to the initial aqueous acetic acid charge before coupling
**half resin (b) was added to the dissolved coupling component before coupling
***the dissolved resin was added to the dissolved coupling component before coupling
****the pigment was ground with surfactant (c) in water as per Example 1 of EP-A-84 645 and spray-dried II) Assessment of Coloristic Properties Coloristic properties were assessed by preparing printing inks by grinding 24 g of each coated pigment in 126 g of a commercially available aqueous based acrylate grind resin having a solids content of 35.5% by weight using 300 g of steel balls (2–3 mm diameter) on a Skandex for 30 min and aging the resulting dispersion for 30 min in a conditioning cabinet at 20° C. and then reducing it with further grind resin to a pigment content of 8% by weight.

Gloss was determined by measuring drawdowns of these printing inks on Algro-finess paper (Hannoversche Papierfabriken, Alsfeld) (Examples 1 to 18 and C1 to C3) or acetate film (Examples 19 to 21 and C4 to C5) prepared with a 12 μm wire wound bar or a whirler (from Engelsmann, Ludwigshafen) using a micro-Tri-gloss or Multigloss instrument (both from Byk-Gardner) at a measuring angle of 60°.

Transparency was determined visually on drawdowns of the printing inks on aluminum foil, likewise prepared with a 12 μm wire wound bar, against the following scale:

| | |
|---|---|
| +5 | distinctly more transparent |
| +4 | more transparent |
| +3 | somewhat more transparent |
| +2 | a little more transparent |
| +1 | trace more transparent |
| 0 | standard (comparison with uncoated pigment) |
| −1 | trace more hiding |
| −2 | a little more hiding |
| −3 | somewhat more hiding |
| −4 | more hiding |
| −5 | distinctly more hiding |

The results of these tests are summarized in Table 2 (where uncoated C.I. Pigment Yellow 13 corresponds to Comparative Example C and uncoated C.I. Pigment Blue 15:3 to Comparative Example C').

TABLE 2

| Printing ink with pigment of Example | Gloss | Transparency |
|---|---|---|
| 1 | 23 | +5 |
| 2 | 20 | +5 |
| 3 | 24 | +5 |
| 4 | 18 | +5 |
| 5 | 18 | +5 |
| 6 | 16 | +5 |
| 7 | 17 | +3 |
| 8 | 8 | +3 |
| 9 | 13 | +3 |
| 10 | 12 | +3 |
| 11 | 8 | +3 |
| 12 | 24 | +3 |
| 13 | 20 | +3 |
| 14 | 22 | +3 |
| C | 3 | −5 |
| C1 | 3 | −5 |
| C2 | 19 | 0 |
| C3 | 17 | −3 |
| 15 | 9 | +4 |
| 16 | 15 | +5 |
| 17 | 10 | +3 |
| 18 | 15 | +3 |
| 19 | 74 | +4 |
| 20 | 67 | +2 |
| 21 | 64 | +2 |
| C' | 37 | 0 |
| C4 | 53 | −2 |
| C5 | 12 | −5 |

We claim:

1. Pigment preparations obtained by coating an organic pigment (a) suspended in an aqueous medium with a resin (b) having an acid number of ≧200 and with a nonionic surfactant (c), and isolating and optionally drying and mechanically comminuting the coated pigment.

2. Pigment preparations as claimed in claim 1, wherein resin (b) is a fumaric or maleic acid-modified rosin.

3. Pigment preparations as claimed in claim 1, wherein surfactant (c) is selected from ethoxylates of aliphatic $C_8$–$C_{18}$-alcohols, $C_1$–$C_{12}$-alkylphenols or aliphatic $C_8$–$C_{18}$-alkylamines, propylene oxide/ethylene oxide adducts with di- to pentafunctional alkyleneamines having from 2 to 12 carbon atoms or propylene oxide/ethylene oxide block polymers.

4. Pigment preparations as claimed in claim 1, wherein surfactant (c) is selected from reaction products of ethylenediamine with propylene oxide and ethylene oxide having an average molecular weight of from 3000 to 40,000.

5. Pigment preparations as claimed in claim 1, comprising
   a) from 50 to 94% by weight of the organic pigment;
   b) from 3 to 30% by weight of the resin having an acid number of ≧200;
   c) from 3 to 20% by weight of the nonionic surfactant.

6. A process for manufacturing pigment preparations comprising coating an organic pigment (a) suspended in an aqueous medium with a resin (b) having an acid number of ≧200 and with a nonionic surfactant (c), and isolating and optionally drying and mechanically comminuting the coated pigment.

7. A process as claimed in claim 6, wherein resin (b) is added to the pigment suspension in dissolved form and then precipitated onto the pigment particles in the presence of surfactant (c) by addition of an inorganic or organic acid.

8. A method of pigmenting water-thinnable printing inks and coatings, which comprises incorporating the pigment preparations of claim 1 into said water-thinnable printing inks and coatings.

9. Water-thinnable printing inks and coatings comprising the pigment preparations of claim 1.

* * * * *